United States Patent
Fan et al.

(10) Patent No.: US 11,282,204 B2
(45) Date of Patent: Mar. 22, 2022

(54) SIMULATED AND MEASURED DATA-BASED MULTI-TARGET THREE-DIMENSIONAL ULTRASOUND IMAGE SEGMENTATION METHOD

(71) Applicant: Shantou Institute of Ultrasonic Instruments Co., Ltd., Shantou (CN)

(72) Inventors: Liexiang Fan, Shantou (CN); Delai Li, Shantou (CN); Jinyao Yang, Shantou (CN); Jingfeng Guo, Shantou (CN); Zhonghong Wu, Shantou (CN)

(73) Assignee: SHANTOU INSTITUTE OF ULTRASONIC INSTRUMENTS CO., LTD., Shantou (CN)

( * ) Notice: Subject to any disclaimer, the term of this patent is extended or adjusted under 35 U.S.C. 154(b) by 82 days.

(21) Appl. No.: 16/478,824

(22) PCT Filed: Aug. 28, 2017

(86) PCT No.: PCT/CN2017/000541
§ 371 (c)(1),
(2) Date: Aug. 19, 2020

(87) PCT Pub. No.: WO2019/023819
PCT Pub. Date: Feb. 7, 2019

(65) Prior Publication Data
US 2021/0390701 A1  Dec. 16, 2021

(30) Foreign Application Priority Data
Aug. 3, 2017  (CN) .......................... 201710654163.5

(51) Int. Cl.
*G06T 7/11*  (2017.01)
*G06T 7/136*  (2017.01)
(Continued)

(52) U.S. Cl.
CPC ................ *G06T 7/11* (2017.01); *G06T 7/136* (2017.01); *G06T 7/149* (2017.01); *G06T 7/187* (2017.01);
(Continued)

(58) Field of Classification Search
CPC ... G06T 7/12; G06T 2207/10136; G06T 7/11; G06T 2207/30096; G06T 7/149; G06T 7/136; G06T 7/187; G06T 2207/20116
See application file for complete search history.

(56) References Cited

U.S. PATENT DOCUMENTS 6,246,784 B1 * 6/2001 Summers ........... G06K 9/00201
382/128
2008/0292194 A1 * 11/2008 Schmidt .................... G06T 7/11
382/217
(Continued)

FOREIGN PATENT DOCUMENTS

CA     2634490 A1 * 6/2007 ............. G06T 7/149
CN    102402788       4/2012
(Continued)

OTHER PUBLICATIONS

3D Rigid Registration of Intraoperative Ultrasound and Preoperative MR Brain Images Based on Hyperechogenic Structures (Year: 2012).*
A Hybrid Geometric-Statistical Deformable Model for Automated 3-D Segmentation in Brain MRI (Year: 2009).*
International Society for Therapeutic Ultrasound Conference 2016 (Year: 2016).*
(Continued)

*Primary Examiner* — Nizar N Sivji
(74) *Attorney, Agent, or Firm* — Dragon Sun Law Firm, PC; Jinggao Li, Esq.

(57) ABSTRACT

The disclosure provides a multi-target 3D ultrasound image segmentation method based on simulated and measured data. The method includes: presetting conventional acoustic parameters; collecting raw 3D data; employing an initial segmentation algorithm to segment the raw 3D data; sub-
(Continued)

stituting with the conventional acoustic parameters according to probability in order to form a transitional image model; performing a simulation operation; performing transformation to obtain simulated data; performing a comparison operation; adjusting corresponding magnitude of the probability in each probability variable, and returning to the step of substituting with the conventional acoustic parameters. According to the probability, the conventional acoustic parameters are substituted into a model of an incomplete target tissue, the simulation operation is then performed, the probability is adjusted, and repeatedly, corrections are performed continuously in an iterative convergence manner till each incomplete target tissue is completely substituted by a certain normal tissue or lesion tissue.

6 Claims, 2 Drawing Sheets

(51) Int. Cl.
  *G06T 7/149* (2017.01)
  *G06T 7/187* (2017.01)
(52) U.S. Cl.
  CPC ......... *G06T 2207/10136* (2013.01); *G06T 2207/20116* (2013.01); *G06T 2207/30096* (2013.01)

(56) References Cited

U.S. PATENT DOCUMENTS

| | | |
|---|---|---|
| 2011/0033096 A1 | 2/2011 | Lee et al. |
| 2013/0060121 A1* | 3/2013 | Patwardhan .......... A61B 8/469 600/407 |
| 2014/0163375 A1* | 6/2014 | Wasielewski ........ A61B 8/0875 600/443 |
| 2015/0023578 A1* | 1/2015 | Li .......................... G06T 7/136 382/131 |
| 2016/0314580 A1* | 10/2016 | Lloyd ................... G06T 7/0012 |
| 2017/0103525 A1* | 4/2017 | Hu .............................. G06T 7/41 |
| 2017/0150941 A1* | 6/2017 | Jago ..................... A61B 8/5207 |
| 2017/0345154 A1* | 11/2017 | Chen ..................... G06K 9/6256 |

FOREIGN PATENT DOCUMENTS

| | | |
|---|---|---|
| CN | 102973293 | 3/2013 |
| CN | 105913075 | 8/2016 |
| CN | 106780460 | 5/2017 |

OTHER PUBLICATIONS

Three-Dimensional Spatiotemporal Features for Fast Content-Based Retrieval of Focal Liver Lesions (Year: 2014).*
Semi-Automatic Segmentation and Ultrasonic Characterization of Solid Breast Lesions (Year: 2017).*
Search Report of PCT/CN2017/000541.
Written Opinion of PCT/CN2017/000541.

* cited by examiner

SIMULATED AND MEASURED DATA-BASED MULTI-TARGET THREE-DIMENSIONAL ULTRASOUND IMAGE SEGMENTATION METHOD

CROSS-REFERENCE TO RELATED PATENT APPLICATIONS

This application is a national stage application of PCT Application No. PCT/CN2017/000541. This Application claims priority from PCT Application No. PCT/CN2017/000541, filed Aug. 28, 2017, and CN Application No. 201710654163, filed Aug. 3, 2017, the contents of which are incorporated herein in the entirety by reference.

TECHNICAL FIELD

The present disclosure relates to an ultrasound imaging method, and in particular to a multi-target 3-dimensional (3D) ultrasound image segmentation method based on simulated and measured data.

BACKGROUND

The research on ultrasound image segmentation has a long history, and from simple thresholding to active contour, from region growing to level set and from game theory to neutrosophic logic theory, the accuracy of segmentation results has substantial progress. Further, these methods are also developed from 2-Dimensional (2D) data to 3D data. However, the current actual application still cannot completely meet requirements. The main reason is the complexity of ultrasound data. For example, when most of ultrasound energy is reflected or absorbed at a specific location in the body tissue, only a little of the energy propagates behind this location so as to cause that the image shows a shadow region with a low gray scale, and the shadow at the back of a lesion region is sufficient to cause the above-mentioned method to be completely invalid. Therefore, there are some limitations to segmenting ultrasound images by totally depending on the data itself.

SUMMARY

An objective of the present disclosure is to provide a multi-target 3D ultrasound image segmentation method based on simulated and measured data. The multi-target 3D ultrasound image segmentation method based on simulated and measured data can overcome the defect that image segmentation cannot be performed due to a shadow in the existing segmentation algorithm and obtains a complete image model. The adopted technical solution is as follows: the multi-target 3D ultrasound image segmentation method based on simulated and measured data is characterized by comprising the following steps:

(1) presetting conventional acoustic parameters of each normal tissue and lesion tissue;

(2) collecting raw 3D data including one or more suspected lesion locations;

(3) employing an initial segmentation algorithm to segment the raw 3D data to obtain an initial image model including a plurality of incomplete target tissues, wherein the initial image model comprises actual acoustic parameters of each incomplete target tissue; defining attributes of each incomplete target tissue; and according to the attributes of each incomplete target tissue, employing a group of probability variables to represent the probability of each incomplete target tissue to be a certain normal tissue or lesion tissue;

(4) selecting the conventional acoustic parameters of a corresponding normal tissue or lesion tissue to substitute the actual acoustic parameters of the incomplete target tissue in the initial image model according to the probability of each target tissue in order to form a transitional image model including a plurality of complete target tissues;

(5) performing a simulation operation on the transitional image model by utilizing the principle of ultrasound imaging;

(6) performing corresponding numerical transformation and geometric transformation on simulation operation results to obtain simulated data equivalent to the raw 3D data;

(7) performing a comparison operation on the obtained simulated data and the collected raw 3D data; and (8) determining comparison operation results; when each comparison operation result is lower than a preset threshold, utilizing the transitional image model obtained in step (4) as the final result to output; when a part of the comparison operation result is higher than the preset threshold, redefining the attribute of each different incomplete target tissue, adjusting the magnitude of the probability in each corresponding probability variable according to the attributes of the different incomplete target tissues, and returning to step (4).

The above normal tissues are adipose tissue, connective tissue and the like, and the lesion tissues are solid cyst, liquid cyst and the like.

The above conventional acoustic parameters are acoustic characteristics of human tissues, such as density, acoustic velocity and the like, and conventionally are accepted and known parameters or parameters obtained based on tests. But the actual acoustic parameters are directly obtained results by segmenting the raw 3D data.

According to the present disclosure, the conventional segmentation algorithm is utilized to perform initial segmentation on the raw 3D data to obtain the initial image model including a plurality of target tissues, a group of probability variables is used for representing the probability of each incomplete target tissue as a certain normal tissue or lesion tissue, the corresponding conventional acoustic parameters are substituted according to the probability, and the simulation operation is performed according to the principle of ultrasound imaging to obtain the simulated data, the simulated data is compared with the raw 3D data, the probability of each incomplete target tissue as a certain normal tissue or lesion tissue is adjusted according to the matching degree of the simulated data and the raw 3D data, and repeatedly, corrections are performed continuously in the iterative convergence manner till each incomplete target tissue is completely substituted by a certain normal tissue or lesion tissue, thereby obtaining a complete image model and overcoming the defect that image segmentation cannot be performed due to the shadow in the existing segmentation algorithm.

In one preferred embodiment of the present disclosure, in step (3), employing an initial segmentation algorithm to segment the raw 3D data comprises: computing a characteristic value of the collected 3D data, finding out a special reference point of each target tissue unit, and utilizing these reference points or regions to determine a geometric model of each target tissue and an initial position of a surrounding tissue interface so as to obtain an outline of each incomplete target tissue. The above characteristic value may be an image gray scale, a target interface gradient and the like; the special reference point may be a nipple of the breast and the like; and the surrounding tissue interface may be a rib and the like.

In one preferred embodiment of the present disclosure, in step (3), the initial segmentation algorithm is thresholding, active contour, region growing, level set, game theory or neutrosophic logic theory. The thresholding, the active contour, the region growing, the level set, the game theory or the neutrosophic logic theory is the existing segmentation algorithm and is introduced in the background.

In one preferred embodiment of the present disclosure, in step (3), the step of employing an initial segmentation algorithm to segment the raw 3D data is directly omitted, and conventional acoustic parameters of a homogeneous medium is utilized to substitute the actual acoustic parameters of each incomplete target tissue.

In one preferred embodiment of the present disclosure, in step (2), operating parameters of ultrasound imaging are further collected and are taken as operating parameters of the simulation operation in step (5). The above operating parameters of ultrasound imaging comprise transmitting frequency, system bandwidth, a gain curve and the like. It is closer to the truth by utilizing the operating parameters of ultrasound imaging when collecting the raw 3D data as the operating parameters of the simulation operation such that the comparison result of the simulated data and the raw 3D data is more accurate.

In one preferred embodiment of the present disclosure, in step (7), the comparison operation is a subtraction or matrix correlation operation.

DESCRIPTION OF THE EMBODIMENTS

The present disclosure is further described below with reference to the accompanying drawings and preferable embodiments of the present disclosure.

Embodiment 1

Figure 1:
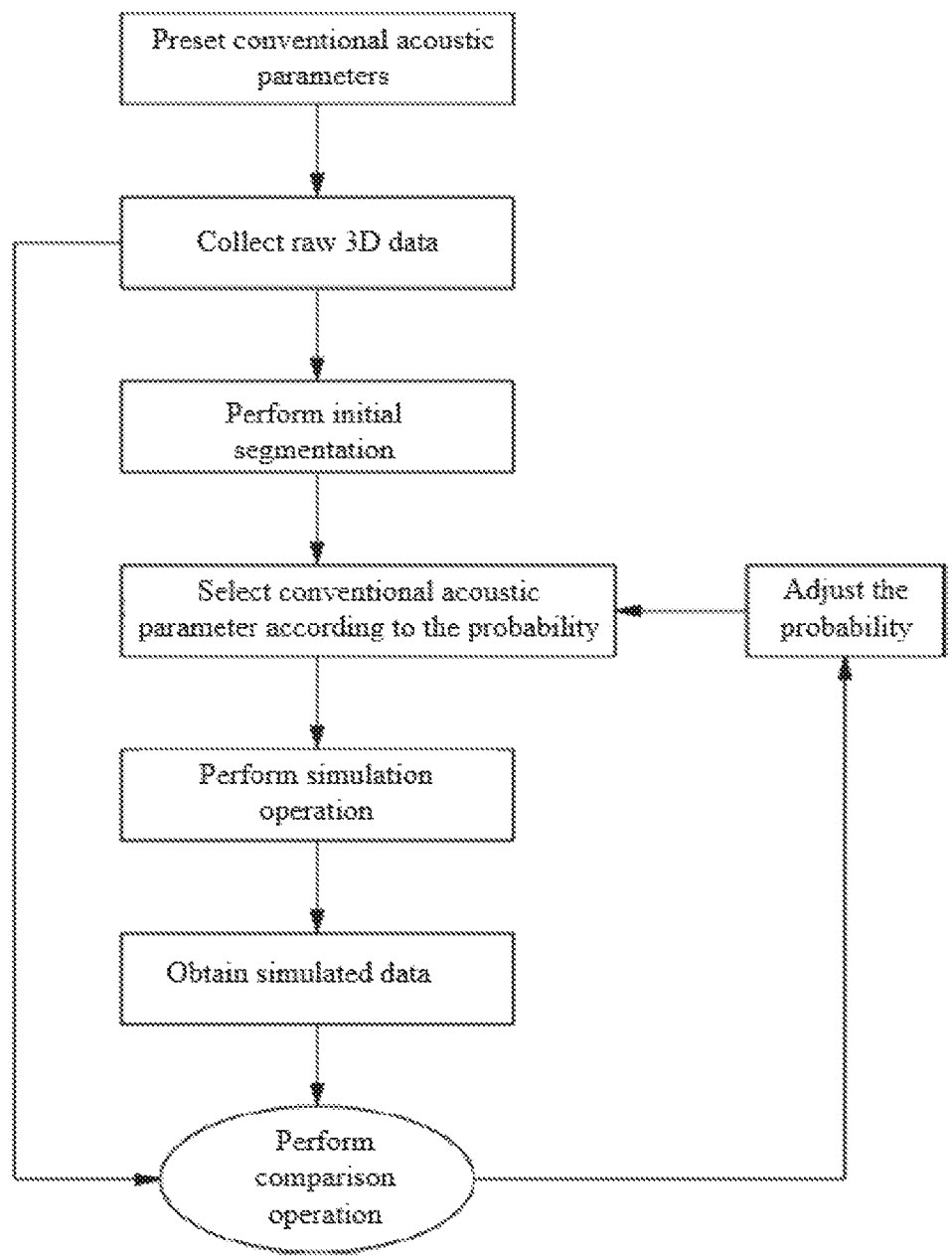
FIG. 1 illustrates a flowchart of Embodiment 1 of the present disclosure.

As shown in FIG. 1, the multi-target 3D ultrasound image segmentation method based on simulated and measured data comprises the following steps:
(1) presetting conventional acoustic parameters of each normal tissue and lesion tissue;
(2) collecting raw 3D data including a suspected lesion location, and collecting operating parameters of ultrasound imaging;
(3) employing an initial segmentation algorithm to segment the raw 3D data to obtain an initial image model including a plurality of incomplete target tissues, wherein the initial image model comprises actual acoustic parameters of each incomplete target tissue; defining attributes of each incomplete target tissue; according to the attribute of each incomplete target tissue, employing a group of probability variables to represent the probability of each incomplete target tissue to be a certain normal tissue or lesion tissue, wherein the initial segmentation algorithm is thresholding, active contour, region growing, level set, game theory or neutrosophic logic theory; employing an initial segmentation algorithm to segment the raw 3D data comprises: computing a characteristic value of the collected 3D data, finding out a special reference point of each target tissue unit, and utilizing these reference points or regions to determine a geometric model of each target tissue and an initial position of a surrounding tissue interface so as to obtain an outline of each incomplete target tissue;
(4) selecting the conventional acoustic parameters of a corresponding normal tissue or lesion tissue to substitute the actual acoustic parameters of the incomplete target tissue in the initial image model according to the probability of each target tissue in order to form a transitional image model including a plurality of complete target tissues;
(5) performing a simulation operation on the transitional image model by utilizing the principle of ultrasound imaging, and employing the collected operating parameters of ultrasound imaging as the operating parameters of the simulation operation;
(6) performing corresponding numerical transformation and geometric transformation on simulation operation results to obtain simulated data equivalent to the raw 3D data;
(7) performing a comparison operation on the obtained simulated data and the collected raw 3D data, wherein the comparison operation can utilize a subtraction or matrix correlation operation; and
(8) determining comparison operation results; when each comparison operation result is lower than a preset threshold, utilizing the transitional image model obtained in step (4) as the final result to output; when a part of the comparison operation result is higher than the preset threshold, redefining the attributes of each different incomplete target tissue, adjusting the magnitude of the probability in each corresponding probability variable according to the attributes of the different incomplete target tissues, and returning to step (4).

Embodiment 2

Figure 2:
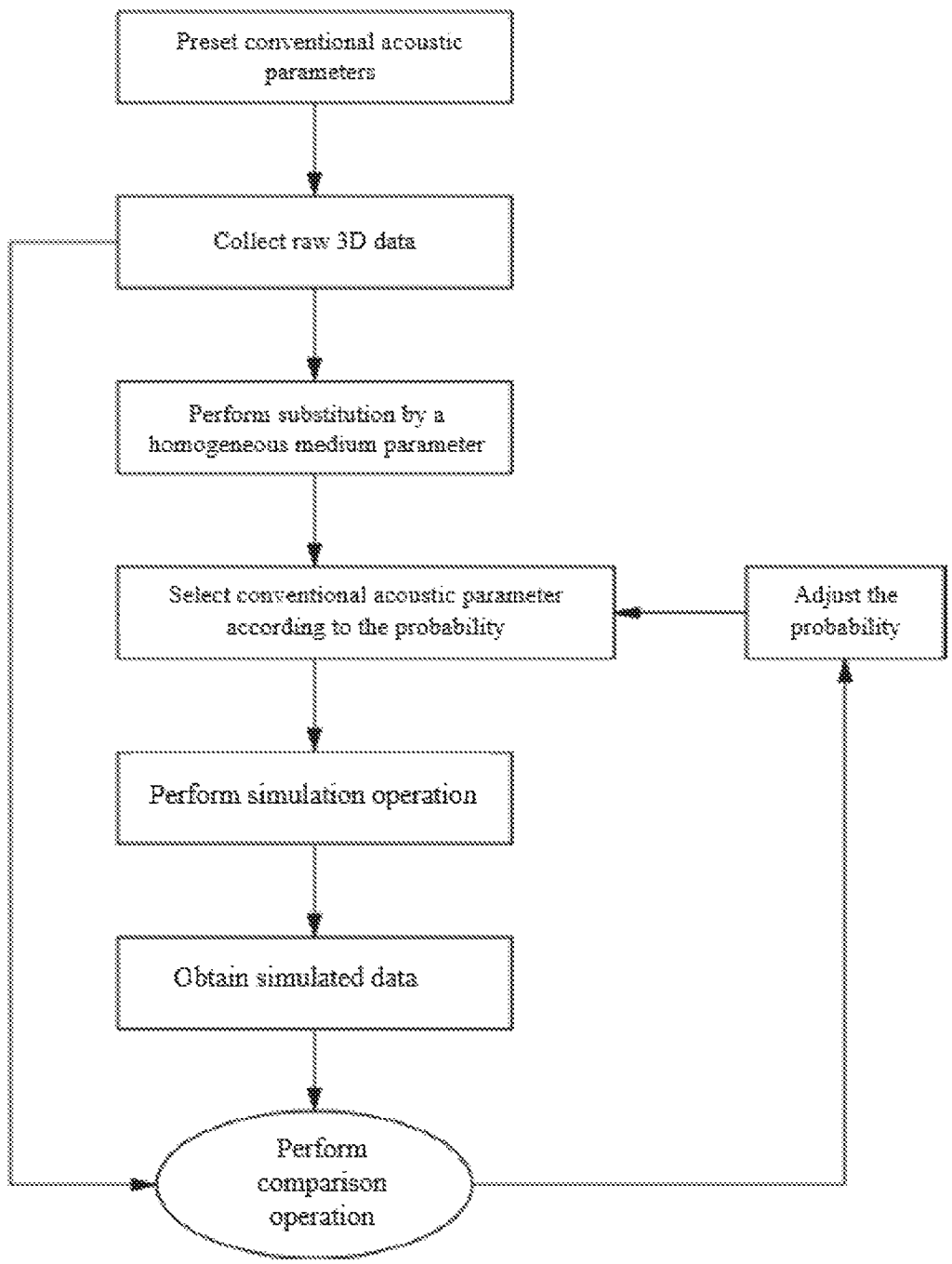
FIG. 2 illustrates a flowchart of Embodiment 2 of the present disclosure.

As shown in FIG. 2, other parts are the same as Embodiment 1, and the difference lies on: in step (3), the step of employing an initial segmentation algorithm to segment the raw 3D data is directly omitted, and conventional acoustic parameters of a homogeneous medium is utilized to substitute the actual acoustic parameters of each incomplete target tissue.

Furthermore, it should be noted that the name and the like of each part in specific embodiments described in the specification can be different, but all equivalent or simple changes made according to the structure, the characteristics and the principle of the present disclosure should fall within the protection scope of the present disclosure. Various modifications or supplementations or similar substitutions made to the described specific embodiments by those skilled in the art should fall within the protection scope of the present disclosure without departing from the structure of the present disclosure or exceeding the scope of the appended claims.

What is claimed is:
1. A multi-target 3D ultrasound image segmentation method based on simulated and measured data, comprising the following steps:
(1) presetting conventional acoustic parameters of each normal tissue and lesion tissue;
(2) collecting raw 3D data comprising one or more suspected lesion locations;

(3) employing an initial segmentation algorithm to segment the raw 3D data to obtain an initial image model comprising a plurality of incomplete target tissues, wherein the initial image model comprises actual acoustic parameters of each incomplete target tissue; defining attribute of each incomplete target tissue; according to the attribute of each incomplete target tissue, employing a group of probability variables to represent the probability of each incomplete target tissue to be a certain normal tissue or lesion tissue;

(4) selecting the conventional acoustic parameters of a corresponding normal tissue or lesion tissue to substitute the actual acoustic parameters of the incomplete target tissue in the initial image model according to the probability of each target tissue in order to form a transitional image model comprising a plurality of complete target tissues;

(5) performing a simulation operation on the transitional image model by utilizing the principle of ultrasound imaging;

(6) performing corresponding numerical transformation and geometric transformation on simulation operation results to obtain simulated data equivalent to the raw 3D data;

(7) performing a comparison operation on the obtained simulated data and the collected raw 3D data; and (8) determining comparison operation results; when each comparison operation result is lower than a preset threshold, utilizing the transitional image model obtained in step (4) as the final result to output; when a part of the comparison operation result is higher than the preset threshold, redefining the attributes of each different incomplete target tissue, adjusting the magnitude of the probability in each corresponding probability variable according to the attributes of the different incomplete target tissues, and returning to step (4).

2. The multi-target 3D ultrasound image segmentation method according to claim 1, wherein in step (3), employing an initial segmentation algorithm to segment the raw 3D data comprises: computing a characteristic value of the collected 3D data, finding out a special reference point of each target tissue unit, and utilizing these reference points or regions to determine a geometric model of each target tissue and an initial position of a surrounding tissue interface so as to obtain an outline of each incomplete target tissue.

3. The multi-target 3D ultrasound image segmentation method according to claim 1, wherein in step (3), the initial segmentation algorithm is thresholding, active contour, region growing, level set, game theory or neutrosophic logic theory.

4. The multi-target 3D ultrasound image segmentation method according to claim 1, wherein in step (3), the step of employing an initial segmentation algorithm to segment the raw 3D data is directly omitted, and conventional acoustic parameters of a homogeneous medium is utilized to substitute the actual acoustic parameters of each incomplete target tissue.

5. The multi-target 3D ultrasound image segmentation method according to claim 1, wherein in step (2), operating parameters of ultrasound imaging are further collected and are taken as operating parameters of the simulation operation in step (5).

6. The multi-target 3D ultrasound image segmentation method according to claim 1, wherein in step (7), the comparison operation is a subtraction or matrix correlation operation.

* * * * *